US008638909B2

(12) United States Patent
Agapi et al.

(10) Patent No.: US 8,638,909 B2
(45) Date of Patent: *Jan. 28, 2014

(54) DYNAMICALLY PUBLISHING DIRECTORY INFORMATION FOR A PLURALITY OF INTERACTIVE VOICE RESPONSE SYSTEMS

(75) Inventors: Ciprian Agapi, Lake Worth, FL (US); William K. Bodin, Austin, TX (US); Charles W. Cross, Jr., Wellington, FL (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/527,355

(22) Filed: Jun. 19, 2012

(65) Prior Publication Data
US 2012/0257730 A1 Oct. 11, 2012

Related U.S. Application Data

(63) Continuation of application No. 12/109,214, filed on Apr. 24, 2008, now Pat. No. 8,229,081.

(51) Int. Cl.
*H04M 1/64* (2006.01)
(52) U.S. Cl.
USPC ................. 379/88.04; 379/88.16; 379/265.01
(58) Field of Classification Search
USPC ............................... 379/88.16, 88.01, 265.01
See application file for complete search history.

(56) References Cited

U.S. PATENT DOCUMENTS

| 7,180,985 | B2 * | 2/2007 | Colson et al. ............... 379/88.16 |
| 2001/0055370 | A1 * | 12/2001 | Kommer ..................... 379/88.01 |
| 2007/0201677 | A1 * | 8/2007 | Bates et al. ............... 379/265.01 |

OTHER PUBLICATIONS

"U.S. Appl. No. 12/109,214 Office Action", Jul. 25, 2011, 19 pages.

* cited by examiner

*Primary Examiner* — Mohammad Islam
*Assistant Examiner* — Van D. Huynh
(74) *Attorney, Agent, or Firm* — DeLizio Gilliam, PLLC

(57) ABSTRACT

Some example embodiments include a method of dynamically publishing directory information for a plurality of interactive voice response ('IVR') systems. The method includes receiving, by the IVR directory service on behalf of one of the IVR systems, a web services update request. The method includes determining, by the IVR directory service in response to the web services update request, updated directory information for the IVR system. The method includes updating the IVR system directory with the updated directory information for the IVR system. The method includes generating an updated voice mode user interface to reflect the updated IVR system directory with the updated directory information for the IVR system. The generating includes creating one more voice dialogs in accordance with the directory information, the one or more voice dialogs specifying a call flow defining the interaction between a caller and the IVR directory service.

20 Claims, 4 Drawing Sheets

DYNAMICALLY PUBLISHING DIRECTORY INFORMATION FOR A PLURALITY OF INTERACTIVE VOICE RESPONSE SYSTEMS

RELATED APPLICATIONS

This application claims the priority benefit of U.S. application Ser. No. 12/109,214 filed Apr. 24, 2008.

BACKGROUND

The field of the invention is data processing, or, more specifically, methods, apparatus, and products for dynamically publishing directory information for a plurality of interactive voice response ('IVR') systems.

Despite the pervasiveness of other types of devices, telephones remain the most popular devices through which people obtain information when they are on the go. As a result, more and more service providers are adding or enhancing IVR systems for their businesses to provide customers with twenty four hour automated access to information and services. To access an IVR system, however, callers first need to know the phone number to dial that allows the caller to establish a connection with the IVR system. Unfortunately, the phone numbers for many IVR systems are unknown to callers, especially new or recently deployed IVR systems. Furthermore, typical telephones only store a relatively small number of frequently dialed phone numbers and therefore may not contain the phone number for the IVR system desired by a caller.

SUMMARY

Some example embodiments include a method of dynamically publishing directory information for a plurality of interactive voice response ('IVR') systems. The method includes providing, by an IVR directory service, a description of a web services publication interface for the IVR directory service. The method includes receiving, by the IVR directory service on behalf of one or more IVR systems requesting publication, web services publication requests through the web services publication interface for the IVR directory service. The method includes determining, by the IVR directory service in response to the web services publication requests, directory information for each IVR system requesting publication. The method includes receiving, by the IVR directory service on behalf of one of the IVR systems, a web services update request. The method includes determining, by the IVR directory service in response to the web services update request, updated directory information for the IVR system. The method includes updating, by the IVR directory service, the IVR system directory with the updated directory information for the IVR system. The method includes generating, by the IVR directory service, an updated voice mode user interface to reflect the updated IVR system directory with the updated directory information for the IVR system. The generating includes creating one more voice dialogs in accordance with the directory information, the one or more voice dialogs specifying a call flow defining the interaction between a caller and the IVR directory service. The method includes interacting, by the IVR directory service using the voice mode user interface, with the caller to identify a particular IVR system in dependence upon the IVR system directory and query information provided by the caller and to connect the caller with the identified IVR system.

DESCRIPTION OF EMBODIMENT(S)

Figure 1:
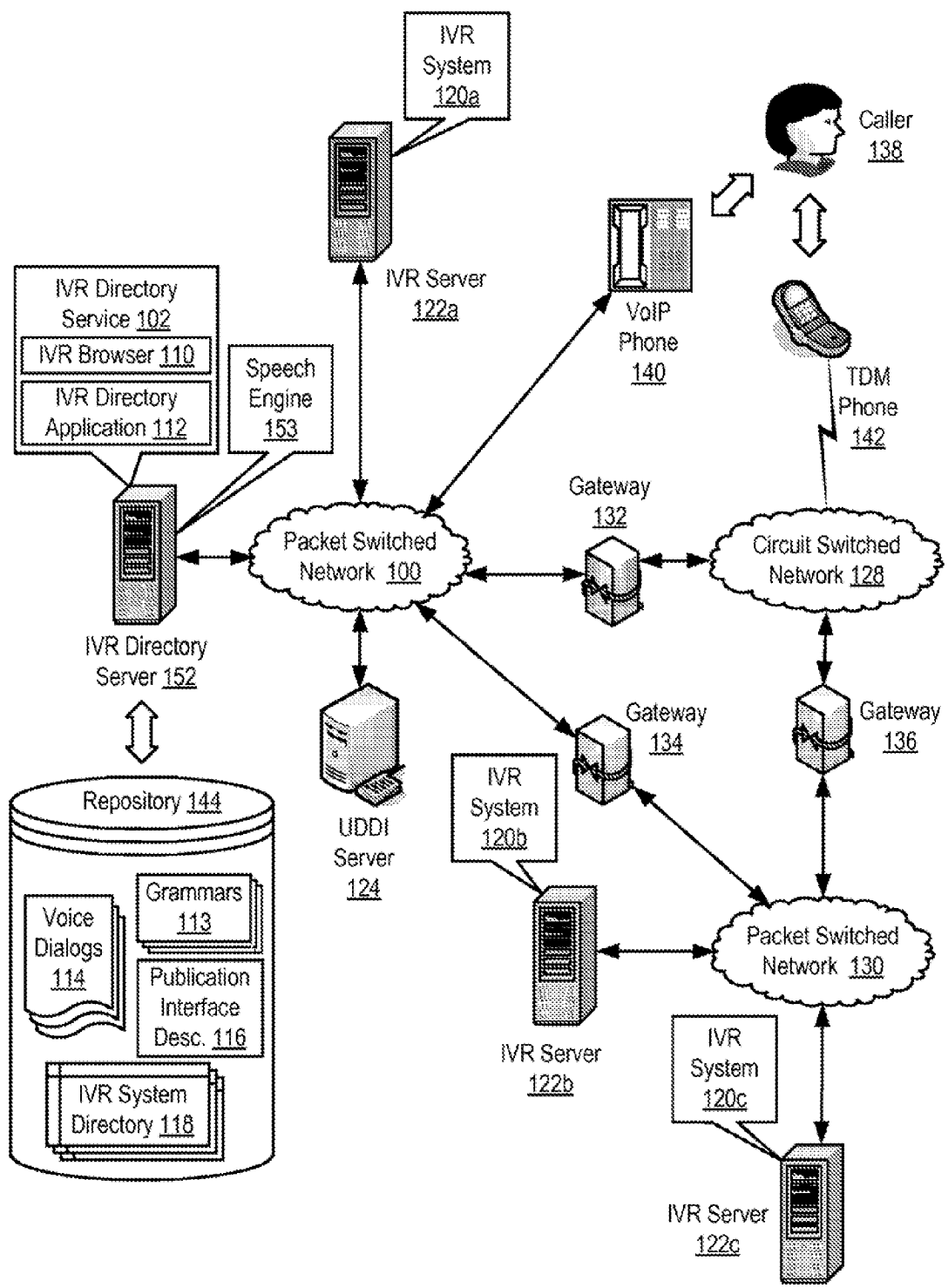
FIG. 1 sets forth a network diagram illustrating an exemplary system for dynamically publishing directory information for a plurality of IVR systems according to embodiments of the present invention.

Exemplary methods, apparatus, and products for dynamically publishing directory information for a plurality of IVR systems according to embodiments of the present invention are described with reference to the accompanying drawings, beginning with FIG. 1. FIG. 1 sets forth a line drawing illustrating an exemplary system for dynamically publishing directory information for a plurality of IVR systems (120) according to embodiments of the present invention. The exemplary system of FIG. 1 includes IVR servers (122) having installed upon them IVR systems (120). Specifically, IVR server (122a) has installed upon it IVR system (120a), IVR server (122b) has installed upon it IVR system (120b), and IVR server (122c) has installed upon it IVR system (120c).

Each IVR system (120) of FIG. 1 is a set of software components that operate together to interact with a caller through a telephone using speech and touch tones. Each IVR system (120) has a phone number that a caller may use to establish a communications connection through the caller's telephone. Upon connecting to a caller, each IVR system (120) may provide the caller with certain information or prompt the caller to provide the IVR system (120) with information using prerecorded or dynamically generated speech. The IVR system (120) may then receiving responses from the caller in the form of touch tones generated from the caller's operation of the phone's keypad or in the form of speech provided by the caller. When the caller provides speech, the IVR system (120) may then utilize a speech engine to recognize and interpret the caller's speech. The interaction between IVR system and a caller is generally governed by the IVR system's call flow. Older IVR systems often utilized proprietary programming or scripting languages to generate the system's call flow, but the call flow for modern IVR systems are typically structured similar to web pages using Voice Extensible Markup Language ('VoiceXML'), Speech Application Language Tags ('SALT'), Telera's Extensible Markup Language ('T-XML') language, and so on. Example applications of IVR systems may include telephone banking, televoting, credit card transactions, telephone investing, teleshopping, and so on. Such IVR systems are useful because these systems scale well to handle large call volumes and provide twenty-four hour, seven day a week access to information and services.

The exemplary system of FIG. 1 includes an IVR directory server (152) having installed upon it an IVR directory service (102) and a speech engine (153). The IVR directory service (102) is a specialized IVR system that provides callers with directory information of other IVR systems registered with the IVR directory service (102). The IVR directory service (102) of FIG. 1 includes a set of computer program instructions for dynamically publishing directory information for a plurality of IVR systems according to embodiments of the present invention. The IVR directory service (102) of FIG. 1 operates generally for dynamically publishing directory information for a plurality of IVR systems according to embodiments of the present invention as follows: The IVR directory service (102) provides a description (116) of a web services publication interface for the IVR directory service (102) that the IVR systems (120) may use to register with the IVR directory service (102). On behalf of the IVR systems (120) requesting publication, the IVR directory service (102) receives web services publication requests through the web services publication interface for the IVR directory service (102). In response to the web services publication requests, the IVR directory service (102) then determines directory information for each IVR system (120) requesting publication. The IVR directory service (102) adds the directory information for each IVR system (120) to an IVR system directory (118). The IVR directory service (102) generates a voice mode user interface to reflect the directory information for each IVR system added to the IVR system directory. Using the voice mode user interface, the IVR directory service (102) interacts with a caller (138) to identify a particular IVR system in dependence upon the IVR system directory (118) and query information provided by the caller (138) and to connect the caller (138) with the identified IVR system.

The IVR directory service (102) of FIG. 1 includes an IVR browser (110) and an IVR directory application (112). The IVR browser (110) of FIG. 1 renders voice dialogs (114) to provide an interface between the IVR directory service (102) and the caller (138). In addition, the IVR browser generates speech for prompting the caller (138) using speech engine (153) and recognizing speech input from the caller (138) using the speech engine (153) and grammars (113). The voice dialogs (114) of FIG. 1 are documents that specify the call flow defining the interaction between the IVR directory server (102) and the caller (138). The voice dialogs (114) may be implemented using VoiceXML, SALT, T-XML, or in any other language as will occur to those of skill in the art.

In the example of FIG. 1, the speech engine (153) is a functional module, typically a software module, although it may include specialized hardware also, that does the work of recognizing and generating or 'synthesizing' human speech. The speech engine implements speech recognition by use of a further module referred to in this specification as an automated speech recognition ('ASR') engine, and the speech engine carries out speech synthesis by use of a further module referred to in this specification as a text-to-speech ('TTS') engine.

The grammars (113) of FIG. 1 communicate to the speech engine (153) the words and sequences of words eligible for speech recognition during the interactions specified by the voice dialogs (114). Grammars useful in dynamically publishing directory information for a plurality of IVR systems according to embodiments of the present invention may be expressed in any format supported by any speech engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art.

Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.O;
    grammar command;
    <command>= [remind me to] calli phone | telephone <name>
    <when>;
    <name>= bob | martha | joe | pete | chris | john | artoush | tom;
    <when> = today | this afternoon | tomorrow | next week;
    ]]>
</grammar>
```

In this example, the elements named <command>, <name>, and <when> are rules of the grammar. Rules are a combination of a rule name and an expansion of a rule that advises a speech engine or a voice interpreter which words presently can be recognized. In this example, expansion includes conjunction and disjunction, and the vertical bars 'I' mean 'or.' A speech engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush' or 'tom', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The IVR directory application (112) of FIG. 1 is a component of the IVR directory service (102) that provides a web services publication interface through which other IVR systems may dynamically register their directory information with the IVR directory service (102). The IVR directory application (112) provides the description (116) of the web services publication interface by publishing the web services publication interface description (116) in a Universal Description, Discovery and Integration ('UDDI') registry hosted by the UDDI server (124). A UDDI registry is a platform-independent, XML-based registry for organizations worldwide to list themselves on the Internet. UDDI is an open industry initiative promulgated by the Organization for the Advancement of Structured Information Standards ('OASIS'), enabling organizations to publish service listings, discover each other, and define how the services or software applications interact over the Internet. The UDDI registry is designed to be interrogated by SOAP messages and to provide access to Web Services Description Language ('WSDL') documents describing the protocol bindings and message formats required to interact with a web service listed in the UDDI registry. In this manner, any of the IVR systems (120) of FIG. 1 may retrieve the web services publication interface description (116) for the IVR directory service (102) from the UDDI registry on the server (124). The term 'SOAP' refers to a protocol promulgated by the World Wide Web Consortium ('W3C') for exchanging XML-based messages over computer networks, typically using Hypertext Transfer Protocol ('HTTP') or Secure HTTP ('HTTPS').

In the example of FIG. 1, the web services publication interface description (116) of FIG. 1 may be implemented as a Web Services Description Language ('WSDL') document. The WSDL specification provides a model for describing a web service's interface as collections of network endpoints, or ports. A port is defined by associating a network address with a reusable binding, and a collection of ports define a service. Messages in a WSDL document are abstract descriptions of the data being exchanged, and port types are abstract collections of supported operations. The concrete protocol and data format specifications for a particular port type constitutes a reusable binding, where the messages and operations are then bound to a concrete network protocol and message format. In such a manner, any one of the IVR systems (120) may utilize the web services publication interface description (116) to invoke the publication service provided by the IVR directory service (102), typically by exchanging SOAP messages with the IVR directory service (102).

In addition to providing a web services interface through which the IVR systems (120) may provide directory information to the IVR directory service (102), the IVR directory application (112) also generates the voice dialogs (114) and the grammar (113) based on the directory information stored in the IVR system directory (118). Typically as the IVR system directory (118) is updated as IVR systems are added or removed from the IVR system directory (118), the IVR directory application (112) creates or modifies the voice dialogs (114) and the grammar (113) that the IVR browser (110) processes during interactions with callers. The IVR directory application (112) of FIG. 1 may be implemented using Java, C, C++, C#, Perl, or any other programming language as will occur to those of skill in the art.

The exemplary system of FIG. 1, the voice dialogs (114), the grammars (113), the publication interface description (116), and the IVR system directory (118) are stored in a repository (144) operatively coupled to the IVR directory service (102). The repository (144) may be implemented as a database stored locally on the IVR directory server (152) or remotely stored and accessed through a network. The IVR directory application (112) may be operatively coupled to such an exemplary repository through an application programming interface ('API') exposed by a database management system ('DBMS') such as, for example, an API provided by the Open Database Connectivity ('ODBC') specification, the Java database connectivity ('JDBC') specification, and so on.

In the example of FIG. 1, the caller (138) accesses the IVR directory service (102) and the IVR systems (120) using a Time Division Multiplexing ('TDM') phone (142) or a Voice over Internet Protocol ('VoIP') phone (140). The TDM phone (142) of FIG. 1 is a telephone that operates using a circuit switched network (128). The circuit switched network (128) of FIG. 1 establishes a fixed communications channel between nodes before any communications between the nodes takes place. The circuit switched network (128) of FIG. 1 may be implemented as a Public Switched Telephone Network ('PSTN'), ISDN B-channel network, Circuit Switched Data ('CSD') and High-Speed Circuit-Switched Data (HSCSD) network in cellular systems such as GSM, an X.21 network, or other as will occur to those of skill in the art.

The VoIP phone (140) is a telephone that operates using a packet switched network such as networks (100, 130) of FIG. 1. 'VoIP' is a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VoIP traffic may be deployed on any IP data communications network, including data communications networks lacking a connection to the rest of the Internet, for instance on a private building-wide local area data communications network or 'LAN'.

Many protocols are used to affect VoIP. The two most popular types of VoIP are affected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VoIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

In the example of FIG. 1, all of the servers and devices are connected together through various communications networks (100, 128, 130). The IVR directory server, the IVR server (122a), the VoIP phone (140), and the UDDI server (124) connect to the packet switched network (100) through a wire line connection. The IVR servers (122b, 122c) connect to the packet switched network (130) through wireline connections. The packet switched networks (100, 130) connect through a gateway (134). The TDM phone (142) connects to the circuit switch network (128) through a wireless connection, although in many embodiments, a TDM phone may utilize a wireline connection. The circuit switch network (128) connects to the packet switch networks (100, 130) through gateways (132, 136), respectively, which provide translation between protocols used in the circuit switch network (128) such as PSTN-V5 and protocols used in the packet switch networks (100, 130) such as SIP.

The packet switched networks (100, 130) of FIG. 1 are composed of a plurality of computers that function as data communications routers, switches, or gateways connected for data communications with packet switching protocols. Such packet switched networks (100, 130) may be implemented with optical connections, wireline connections, or with wireless connections. Such a data communications network may include intranets, internets, local area data communications networks ('LANs'), and wide area data communications networks ('WANs'). Such packet switched networks (100, 130) may implement, for example:
- a link layer with the Ethernet™ Protocol or the Wireless Ethernet™ Protocol,
- a data communications network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The circuit switched network (128) of FIG. 1 is composed of a plurality of devices that function as exchange components, switches, antennas, base stations components, and connected for communications in a circuit switched network (128). Such circuit switched networks (128) may be implemented with optical connections, wireline connections, or with wireless connections. Such circuit switched networks (128) may implement the V5.1 and V5.2 protocols along with other as will occur to those of skill in the art.

The arrangement of the devices (152, 122, 124, 132, 134, 136, 140, 142) and the networks (100, 128, 130) making up the exemplary system illustrated in FIG. 1 are for explanation, not for limitation. Data processing systems useful for dynamically publishing directory information for a plurality of IVR systems according to various embodiments of the present invention may include additional servers, routers, switches, gateways, other devices, and peer-to-peer architectures or others, not shown in FIG. 1, as will occur to those of skill in the art. Networks in such data processing systems may support many protocols in addition to those noted above. Various embodiments of the present invention may be implemented on a variety of hardware platforms in addition to those illustrated in FIG. 1.

Dynamically publishing directory information for a plurality of IVR systems according to embodiments of the present invention may be implemented with one or more computers, that is, automated computing machinery. For further explanation, therefore, FIG. 2 sets forth a block diagram of automated computing machinery comprising an example of an IVR directory server (152) for use in dynamically publishing directory information for a plurality of IVR systems according to embodiments of the present invention. The IVR directory server (152) of FIG. 2 includes at least one processor (156) or 'CPU' as well as random access memory (168) ('RAM') which is connected through a high speed memory bus (166) and bus adapter (158) to processor (156) and to other components of the IVR directory server.

Figure 2:
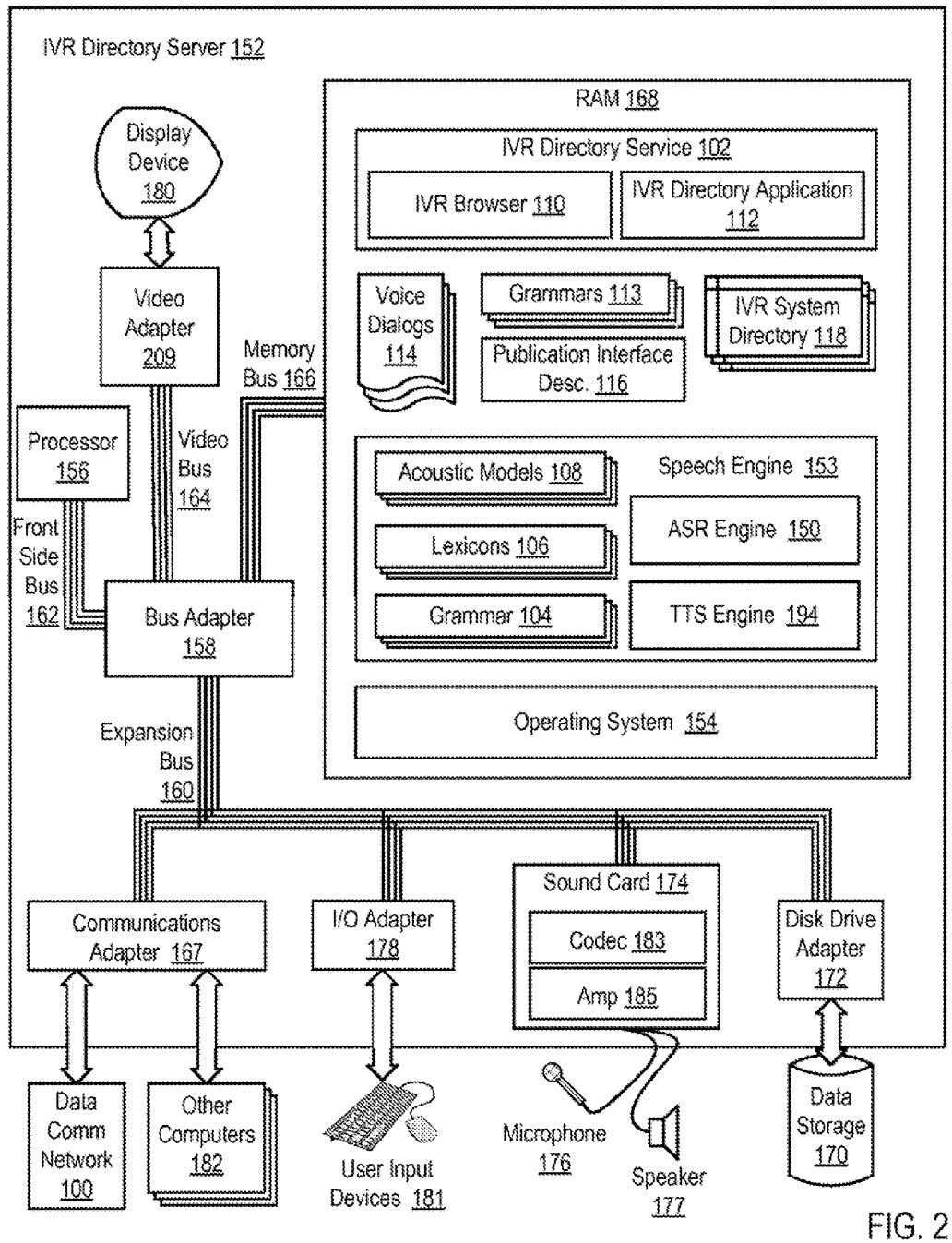
FIG. 2 sets forth a block diagram of automated computing machinery comprising an example of a computer useful in dynamically publishing directory information for a plurality of IVR systems according to embodiments of the present invention.

Stored in RAM (168) of FIG. 2 is an IVR directory service (102) that is a specialized IVR system that provides callers with directory information of other IVR systems registered with the IVR directory service (102). The IVR directory service (102) includes an IVR browser (110) and an IVR directory application (112) that function in the manner described above. The IVR directory service (102) includes a set of IVR directory server program instructions capable of dynamically publishing directory information for a plurality of IVR systems according to embodiments of the present invention. The signaling module (106) operates generally for dynamically publishing directory information for a plurality of IVR systems according to embodiments of the present invention by: providing a description (116) of a web services publication interface for the IVR directory service (102); receiving, on behalf of one or more IVR systems requesting publication, web services publication requests through the web services publication interface for the IVR directory service (102); determining, in response to the web services publication requests, directory information for each IVR system requesting publication; adding the directory information for each IVR system to an IVR system directory (118); generating a voice mode user interface to reflect the directory information for each IVR system added to the IVR system directory (118); and interacting, using the voice mode user interface, with a caller to identify a particular IVR system in dependence upon the IVR system directory (118) and query information provided by the caller and to connect the caller with the identified IVR system. As described above, the voice mode user interface is typically implemented using voice dialogs (114) and grammars (113) specified in the voice dialogs (114).

Also stored in RAM (168) is a speech engine (153). The speech engine (153) of FIG. 2 is a functional module, typically a software module, although it may include specialized hardware also, that does the work of recognizing and generating human speech. The speech engine (153) includes an ASR engine (150) for speech recognition and a text-to-speech ('TTS') engine (194) for generating speech. The speech engine also includes grammars (104), lexicons (106), and language-specific acoustic models (108).

The acoustic models (108) associate speech waveform data representing recorded pronunciations of speech with textual representations of those pronunciations, which are referred to as 'phonemes.' The speech waveform data may be implemented as a Speech Feature Vector ('SFV') that may be represented, for example, by the first twelve or thirteen Fourier or frequency domain components of a sample of digitized speech waveform. Accordingly, the acoustic models (108) may be implemented as data structures or tables in a database, for example, that associate these SFV s with phonemes representing, to the extent that it is practically feasible to do so, all pronunciations of all the words in various human languages, each language having a separate acoustic model (108). The lexicons (106) are associations of words in text form with phonemes representing pronunciations of each word; the lexicon effectively identifies words that are capable of recognition by an ASR engine. Each language has a separate lexicon (106).

The grammars (104) of FIG. 2 communicate to the ASR engine (150) the words and sequences of words that currently may be recognized. For precise understanding, readers will distinguish the purpose of the grammar and the purpose of the lexicon.

The lexicon associates with phonemes all the words that the ASR engine can recognize. The grammar communicates the words currently eligible for recognition. The set of words currently eligible for recognition and the set of words capable of recognition may or may not be the same.

Also stored in RAM (168) is an operating system (154). Operating systems useful in voice servers according to embodiments of the present invention include UNIX™, Linux™, Microsoft Vista™, IBM's AIX™, IBM's i5/0S™, and others as will occur to those of skill in the art. Operating system (154), speech engine (153), grammar analysis module (132), grammar reliability table (134), and background noises (142) in the example of FIG. 2 are shown in RAM (168), but many components of such software typically are stored in non-volatile memory also, for example, on a disk drive (170).

IVR directory server (152) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in IVR directory servers according to embodiments of the present invention include the Intel Northbridge, the Intel Memory Controller Hub, the Intel Southbridge, and the Intel I/0 Controller Hub. Examples of expansion buses useful in IVR directory servers according to embodiments of the present invention include Peripheral Component Interconnect ('PCI') and PCI-Extended ('PCI-X') bus, as well as PCI Express ('PCIe') point to point expansion architectures and others.

IVR directory server (152) of FIG. 2 includes disk drive adapter (172) coupled through expansion bus (160) and bus adapter (158) to processor (156) and other components of the IVR directory server (152). Disk drive adapter (172) connects non-volatile data storage to the IVR directory server (152) in the form of disk drive (170). Disk drive adapters useful in IVR directory servers include Integrated Drive Electronics ('IDE') adapters, Small Computer System Interface ('SCSI') adapters, and others as will occur to those of skill in the art. In addition, non-volatile computer memory may be implemented for an IVR directory server as an optical disk drive, electrically erasable programmable read-only memory (so-called 'EEPROM' or 'Flash' memory), RAM drives, and so on, as will occur to those of skill in the art.

The example IVR directory server of FIG. 2 includes one or more input/output ('I/O') adapters (178). I/O adapters in IVR directory servers implement user-oriented input/output through, for example, software drivers and computer hardware for controlling output to display devices such as computer display screens, as well as user input from user input devices (181) such as keyboards and mice. The example IVR directory server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary IVR directory server (152) of FIG. 2 includes a communications adapter (167) for data communications with other computer (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for testing a grammar used in speech recognition for reliability in a plurality of operating environments having different background noise according to embodiments of the present invention include modems for wired dial-up communications, Ethernet (IEEE 802.3) adapters for wired data communications network communications, and 802.11 adapters for wireless data communications network communications.

Figure 3:
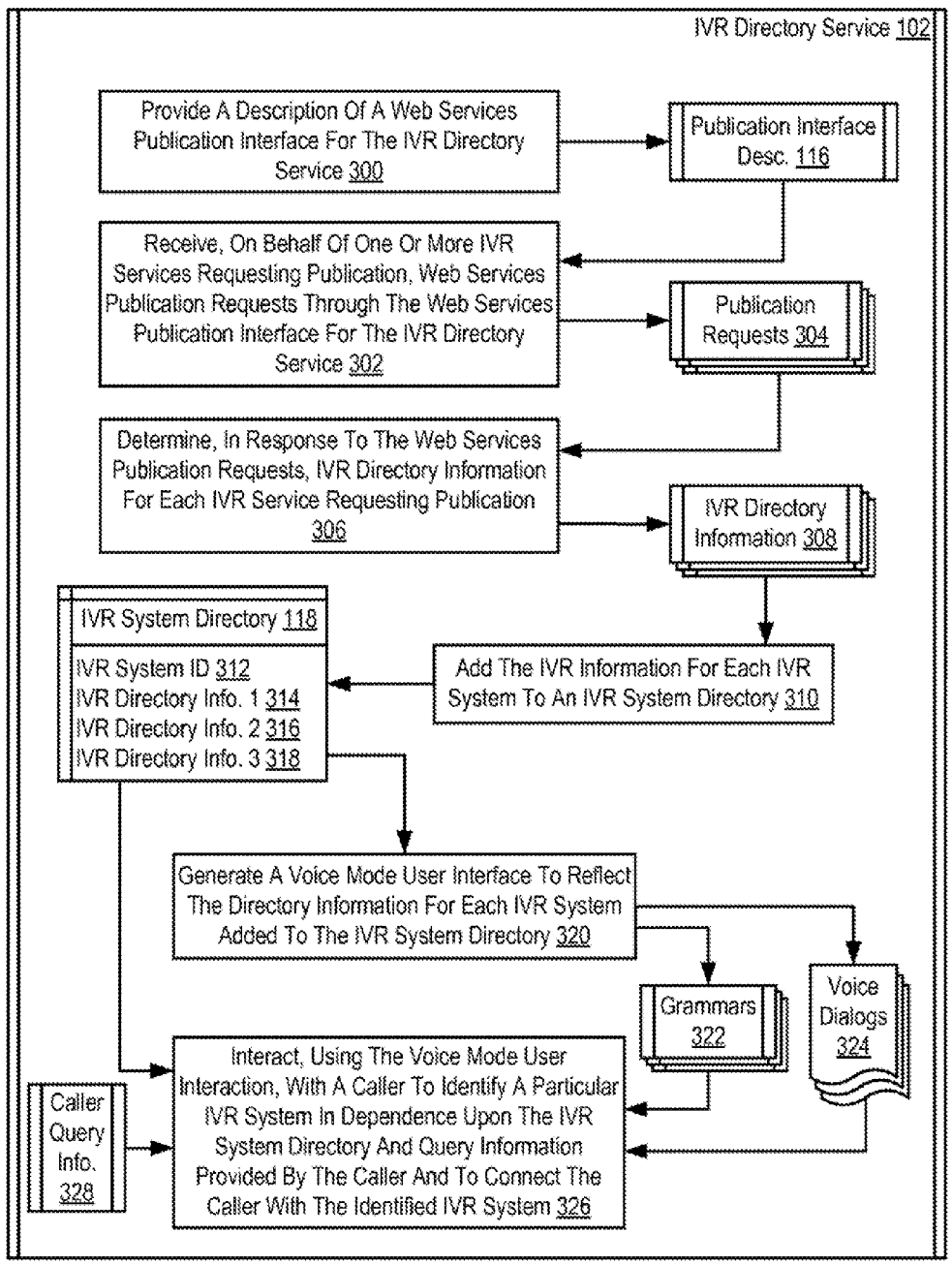
FIG. 3 sets forth a flow chart illustrating an exemplary method of dynamically publishing directory information for a plurality of IVR systems according to embodiments of the present invention.

For further explanation, FIG. 3 sets forth a flow chart illustrating an exemplary method of dynamically publishing directory information for a plurality of IVR systems according to embodiments of the present invention. Dynamically publishing directory information for a plurality of IVR systems according to embodiments of the present invention is carried out by an IVR directory service (102). The IVR directory service (102) of FIG. 3 may operate on a single computer or be distributed across multiple computers.

The method of FIG. 3 includes providing (300), by an IVR directory service (102), a description (116) of a web services publication interface for the IVR directory service (102). The IVR directory service (102) may provide (300) a description (116) of a web services publication interface for the IVR directory service (102) by publishing the web services publication interface description (116) in a UDDI registry for other IVR systems to obtain. The web services publication interface description (116) of FIG. 3 represents a web services interface provided by the IVR directory service (102) that allows the web service components of other systems to publish directory information with the IVR directory service (102). For example, consider the following exemplary web services publication interface description:

```
01:     <?xml version="1.0" encoding="UTF-8"?>
02:     <wsdl:definitions
03:             xmlns:impl="http://service.example.com"
04:             xmlns:intf="http://service.example.com"
05:             xmlns:wsdl="http://schemas.xmlsoap.org/wsdl/"
06:         xmlns:wsdlsoap="http://schemas.xmlsoap.org/wsdl/soap/"
07:             xmlns:wsi="http://ws-i.org/profiles/basic/1.1/xsd"
08:             xmlns:xsd = "http://www.w3.org/2001/XMLSchema"
09:             targetNamespace="http://service.example.com">
10:     <wsdl:types>
11:     <schema xmlns="http://www.w3.org/2001/XMLSchema"
12:              targetNamespace="http://service.example.com"
13:             xmlns:impl="http://service.example.com"
14:             xmlns:intf="http://service.example.com"
15:             xmlns:wsdl="http://schemas.xmlsoap.org/wsdl/"
16:             xmlns:xsd="http://www.w3.org/2001/XMLSchema">
17:             <complexType name="CompanyInfo">
18:                 <sequence>
19:                     <element name="companyName" nillable="false"
20:                         type="xsd:string"/>
21:                     <element name="keyWords" nillable="false" type=
22:                         "xsd:string"/>
23:                     <element name="products" nillable="false" type=
24:                         "xsd:string"/>
25:                     <element name="phoneNumber" nillable="false"
26:                         type="xsd:string"/>
27:                 </sequence>
28:             </complexType>
29:             <element name="setCompanyInfoResponse" nillable="false"
30:                 type="string"/>
31:             <element name="setCompanyInfo" type="impl:CompanyInfo"/>
32:     </schema>
33:     </wsdl:types>
34:     <wsdl:message name="setCompanyInfoResponse">
35:         <wsdl:part element="impl:setCompanyInfoResponse"
36:             name="parameters"/>
37:     </wsdl:message>
38:     <wsdl:message name="setCompanyInfoRequest">
39:         <wsdl:part element="impl:setCompanyInfo" name="parameters"/>
40:     </wsdl:message>
41:     <wsdl:portType name="IVR411">
```

-continued

```
42:        <wsdl:operation name="setCompanyInfo">
43:           <wsdl:input message="impl:setCompanyInfoRequest"
44:              name="setCompanyInfoRequest"/>
45:           <wsdl:output message="impl:setCompanyInfoResponse"
46:              name="setCompanyInfoResponse"/>
47:        </wsdl:operation>
48:     </wsdl:portType>
49:     <wsdl:binding name="IVR411SoapBinding" type="impl:IVR411">
50:        <wsdlsoap:binding style="document"
51:           transport="http://schemas.xmlsoap.org/soap/http"/>
52:        <wsdl:operation name="setCompanyInfo">
53:           <wsdlsoap:operation soapAction=""/>
54:           <wsdl:input name="setCompanyInfoRequest">
55:              <wsdlsoap:body use="literal"/>
56:           </wsdl:input>
57:           <wsdl:output name="setCompanyInfoResponse">
58:              <wsdlsoap:body use="literal"/>
59:           </wsdl:output>
60: <       /wsdl:operation>
61:     </wsdl:binding>
62:     <wsdl:service name="IVR411Service">
63:        <wsdl:port binding="impl:IVR411SoapBinding" name="IVR411">
64:           <wsdlsoap:address location=
65:              "http://some.domain.com/Test/services/IVR411"/>
66:        </wsdl:port>
67:     </wsdl:service>
68:     </wsdl:definitions>
```

The exemplary web services publication interface description above informs other web services that an IVR411Service, which is an implementation of an IVR directory service according to embodiments of the present application, is provided at the URI: http://some.domain.com/Test/services/IVR411. The exemplary web services publication interface description above then goes on to describe the type of messages that the IVR411Service can receive from web service components of other IVR systems that want to publish directory information using the IVR411Service. Using web services message described in the example above, a web service component of an IVR system may register that IVR system's company name, phone number, products, and keywords with the IVR411Service.

The method of FIG. 3 also includes receiving (302), by the IVR directory service (102) on behalf of one or more IVR systems requesting publication, web services publication requests (304) through the web services publication interface for the IVR directory service (102). Each web services publication request (304) of FIG. 3 represents a request to publish directory information for a particular IVR system. In the method of FIG. 3, the IVR directory service (102) may receive (302) web services publication requests (304) on behalf of one or more IVR systems from web services components of the IVR systems themselves or from third party web service components instructed by the IVR system providers to register the IVR systems with the IVR directory service (102). The IVR directory service (102) may receive (302) web services publication requests (304) through the web services publication interface for the IVR directory service (102) according to the method of FIG. 3 by receiving a SOAP message formatted and transmitted according to the web services publication interface description (116).

The method of FIG. 3 includes determining (306), by the IVR directory service (102) in response to the web services publication requests (304), directory information (308) for each IVR system requesting publication. The directory information (308) of FIG. 3 represents lookup information, connection information, description information, or any other information for an IVR system that the IVR directory service (102) may use to provide caller's information or access concerning the IVR system. The lookup information may include, for example, keywords or products identifiers used to lookup an organizations' IVR system. The connection information may include, for example, the telephone number to an organization's IVR system or the connection data needed to transfer the caller from the IVR directory service (102) directly to the desired IVR system. The description information may include, for example, the organization's name that provides the IVR system or the name of the IVR system itself The IVR directory service (102) may determine (306) directory information (308) for each IVR system according to the method of FIG. 3 by retrieving the directory information (308) for each IVR system from the web services publication requests (304) themselves. That is, when an IVR system requests that the IVR directory service (102) publish the IVR system, the IVR system may embedded all of the IVR system's directory information in the publication request (308) for that IVR system. In some other embodiments, the IVR system may not provide directory information (308) in one of the publication requests (304). Rather, the IVR directory service (102) may determine (306) directory information (308) for each IVR system according to the method of FIG. 3 by performing a web services exchange with each IVR system requesting publication to obtain the directory information (308) for each IVR system. In such embodiments, the publication requests (304) may specify an interface for the IVR system, perhaps through use of a WSDL document, that the IVR directory service can use to obtain the directory information (308) for the IVR system. The web services exchange may be carried out using SOAP messages.

The method of FIG. 3 includes adding (310), by the IVR directory service (102), the directory information (308) for each IVR system to an IVR system directory (118). The IVR directory service (102) may add (310) the directory information (308) for each IVR system to an IVR system directory (118) according to the method of FIG. 3 by associating the directory information (308) provided by each IVR system with the IVR system that provided the directory information (308) in the IVR system directory (118). In the example of FIG. 3, the IVR system directory (118) is implemented using one or more tables capable of associating an IVR system with directory information (308) for that IVR system. Each record of the exemplary IVR system directory (118) includes an IVR system identifier field (312) and three directory information fields (314, 316, 318). The IVR system identifier field (312) specifies a particular IVR system published by the IVR directory service (102). The three directory information fields (314, 316, 318) specify directory information (308) for the associated IVR system.

The method of FIG. 3 also includes generating (320), by the IVR directory service (102), a voice mode user interface to reflect the directory information (308) for each IVR system added to the IVR system directory (118). The voice mode user interface represents a set of instructions allow the IVR directory service (102) to provide and receive information from a caller using speech and keypad touch tones. The IVR directory service (102) may generate (320) the voice mode user interface according to the method of FIG. 3 by creating one or more IVR voice dialogs (324) in dependence upon the directory information (308) in the IVR system directory (118). The IVR voice dialogs (324) of FIG. 3 are documents that specify the call flow defining the interaction between the IVR directory server (102) and a caller. The voice dialogs (324) may be implemented using VoiceXML, SALT, T-XML, or in any other language as will occur to those of skill in the art. In addition, the IVR directory service (102) may generate (320) the voice mode user interface according to the method of FIG. 3 by creating one or more IVR grammars (322) in dependence upon the directory information (308) in the IVR system directory (118). The grammars (322) of FIG. 1 communicate to a speech engine the words and sequences of words eligible for speech recognition during the interactions specified by the voice dialogs (324).

The IVR directory service (102) may create the voice dialogs (324) and the grammars (322) by querying the IVR system directory (118) using some predefined queries and incorporating the query results in a one or more voice dialog templates and one or more grammar templates. The queries may be implemented using a Structured Query Language ('SQL') such as, for example, SQL:2006 promulgated by the International Organization for Standardization ('ISO'). Consider for example that the IVR system directory (118) contains the following exemplary directory information:

TABLE 1

EXEMPLARY IVR SYSTEM DIRECTORY

| IVR System ID | COMPANY NAME | Keywords | PRODUCTS | TELEPHONE NO. |
|---|---|---|---|---|
| 0 | ACME Electronics | electronics | television, radio | (123)456-7890 |
| 1 | Mom and Pop's Pizza | food, restaurant | pizza, oven | (234)567-8900 |
| 2 | Western Steakhouse | food, restaurant | — | (345)678-9000 |

Based on the exemplary IVR system directory above in Table 1, the IVR directory service (102) may perform queries and incorporate the query results into a voice dialog template to form the following exemplary voice dialog:

```
01:    <!DOCTYPE vxml PUBLIC "-//W3C//DTD VOICEXML 2.1//EN"
02:        "vxml21-0728.dtd">
03:    <vxml xmlns="http://www.w3.org/2001/vxml" version="2.1"
04:        xml:lang="en-US">
05:
06:        <!--Begin Communication Flow-->
07:        <!--Voice441 service-->
08:        <property name="universals" value="help cancel" />
09:        <property name="audiomaxage" value="1" />
10: <var name="mode" expr="'speech'" />
11: <var name="previousResult" />
12:
13:        <!--Do you want to search by key word, product, or company name?-->
14:        <var name="P00010" />
15:        <form id="P00010">
16:            <field name="fP00010">
17:                <option value="key word">key word</option>
18:                <option value="product">product</option>
18:                <option value="company name">company name</option>
19:                <prompt cond="mode == 'speech'" bargain="true">
20:                    <audio src="findco%20audio/P00010s1.au"> Do you
21:                    want to search by key word, product, or company
22:                    name? </audio>
23:                </prompt>
24:                <filled>
25:                    <assign name="P00010" expr="fP00010" />
26:                    <assign name="previousResult" expr="fP00010" />
27:                    <if cond="fP00010 == 'key word'">
28:                        <goto next="#P00020" />
29:                    <elseif cond="fP00010 == 'product'" />
30:                        <goto next="#P00025" />
31:                    <elseif cond="fP00010 == 'company name'" />
32:                        <goto next="#P00030" />
33:                    </if>
34:                </filled>
35:            </field>
36:        </form>
37:
38:        <!--Please say the key word to search for-->
39:        <var name="P00020" />
40:        <form id="P00020">
```

```
41:         <field name="fP00020">
42:             <grammar src="keywords.grxml"/>
43:             <prompt cond="mode == 'speech'" bargain="true">
44:                 <audio src="findco%20audio/P00020s1.au">
45:                     Please say the key word to search for
46:                 </audio>
47:             </prompt>
48:             <filled>
49:                 <assign name="P00020" expr="fP00020" />
50:                 <assign name="previousResult" expr="fP00020" />
51:                 <if cond="fP00020 == 'food'">
52:                     <goto next="#P00040" />
53:                 <elseif cond="fP00020 == 'electronics'" />
54:                     <goto next="R00020"/>
55:                 </if>
56:             </filled>
57:         </field>
58:     </form>
59:
60:     <!--Call tel: 1234567890 when keyword is electronics or co. is ACME-->
61:     <form id="R00020">
62:         <transfer name="mycall" dest="tel:+1-123-456-7890"
63:             transferaudio="music.wav" connecttimeout="60s"
64:             bridge="true"/>
65:     </form>
66:
67:     <!--Please choose from the following companies within food topic-->
68:     <var name="P00040"/>
69:     <form id="P00040">
70:         <field name="fP00040">
71:             <option value="Mom and Pop's Pizza">
72:                 Mom and Pop's Pizza</option>
73:             <option value="Western Steakhouse">
74:                 Western Steakhouse</option>
75:             <prompt cond="mode == 'speech'" bargain="true">
76:                 <audio src="findco%20audio/P00040s1.au">
77:                     Please choose from the following
78:                 </audio>
79:             </prompt>
80:             <filled>
81:                 <assign name="P00040" expr="fP00040"/>
82:                 <assign name="previousResult" expr="fP00040"/>
83:             </filled>
84:         </field>
85:     </form>
86:
87:     <!--Please say the product name-->
88:     <var name="P00025"/>
89:     <form id="P00025">
90:         <field name="fP00025">
91:             <option value="television">
92:                 television</option>
93:             <option value="radio">
94:                 radio</option>
95:             <option value="pizza oven">
96:                 pizza oven</option>
97:             <prompt cond="mode == 'speech'" bargain="true">
98:                 <audio src="findco%20audio/P00025s1.au">
99:                     Please say the product name
100:                </audio>
101:            </prompt>
102:            <filled>
103:                <assign name="P00025" expr="fP00025" />
104:                <assign name="previousResult" expr="fP00025" />
105:                <if cond="fP00025 == 'television'">
106:                    <goto next="R00020"/>
107:                <elseif cond="fP00025 == 'radio'" />
108:                    <goto next="R00020"/>
109:                <elseif cond="fP00025 == 'pizza oven'" />
110:                    <goto next="R00030"/>
111:                </if>
112:            </filled>
113:        </field>
114:    </form>
115:
116:    <!--Please say the company name-->
117:    <var name="P00030"/>
118:    <form id="P00030">
119:        <field name="fP00030">
120:            <option value="ACME Electronics">
```

```
121:                ACME Electronics</option>
122:            <option value="Mom and Pop's Pizza">
123:                Mom and Pops Pizza</option>
124:            <option value="Western Steakhouse">
125:                Western Steakhouse</option>
126:            <prompt cond="mode == 'speech'" bargain="true">
127:                <audio src="findco%20audio/P00030s1.au">
128:                    Please say the company name
129:                </audio>
130:            </prompt>
131:            <filled>
132:                <assign name="P00030" expr="fP00030" />
133:                <assign name="previousResult" expr="fP00030" />
134:                <if cond="fP00030 == 'Mom and Pops Pizza'">
135:                    <goto next="R00030"/>
136:                <elseif cond="fP00030 == 'Western Steakhouse'" />
137:                    <goto next="R00040"/>
138:                <elseif cond="fP00030 == 'ACME Electronics'" />
139:                    <goto next="R00020"/>
140:                </if>
141:            </filled>
142:        </field>
143:    </form>
144:
145:    <!--Call tel:2345678900 when Mom & Pop Pizza selected-->
146:    <form id="R00030">
147:        <transfer name="mycall" dest="tel:+1-234-567-8900"
148:            transferaudio="music.wav" connecttimeout="60s"
149:            bridge="true"/>
150:    </form>
151:
152:    <!--Call tel: 3456789000 when Western Steakhouse selected-->
153:    <form id="R00040">
154:        <transfer name="mycall" dest="tel:+1-345-678-9000"
155:            transferaudio="music.wav" connecttimeout="60s"
156:            bridge="true"/>
157:    </form>
158: </vxml>
```

In a similar manner, based on the exemplary IVR system directory above in Table 1, the IVR directory service (102) may perform queries and incorporate the query results into a voice dialog template to form the following exemplary grammars used in the exemplary dialog above:

```
01:  <!--Keywords Grammar-->
02:  <?xml version="1.0" encoding ="iso-8859-1"?>
03:  <!DOCTYPE grammar PUBLIC "-//W3C//DTD GRAMMAR 1.0//EN"
04:      "http://www.w3.org/TR/speech-grammar/grammar.dtd">
05:  <grammar version="1.0" xmlns="http://www.w3.org/2001/ 06/grammar"
06:      xml:lang="en-US" root="main_rule">
07:      <rule id="main_rule" scope="public">
08:          <one-of>
09:              <item>Food</item>
10:              <item>Restaurants<tag>Food</tag> </item>
11:              <item>Electronics</item>
12:          </one-of>
13:      </rule>
14:  </grammar>
01:  <!--Products Grammar-->
02:  <?xml version="1.0" encoding ="iso-8859-1"?>
03:  <!DOCTYPE grammar PUBLIC "-//W3C//DTD GRAMMAR 1.0//EN"
04:      "http://www.w3.org/TR/speech-grammar/grammar.dtd">
05:  <grammar version="1.0" xmlns="http://www.w3.org/2001/ 06/grammar"
06:      xml:lang="en-US" root="main_rule">
07:      <rule id="main_rule" scope="public">
08:          <one-of>
09:              <item>television</item>
10:              <item>radio</item>
11:              <item>pizza oven</item>
12:          </one-of>
13:      </rule>
14:  </grammar>
01:  <!--Companies Grammar-->
02:  <?xml version="1.0" encoding ="iso-8859-1"?>
```

```
03:     <!DOCTYPE grammar PUBLIC "-//W3C//DTD GRAMMAR 1.0//EN"
04:            "http://www.w3.org/TR/speech-grammar/grammar.dtd">
05:     <grammar version="1.0" xmlns="http://www.w3.org/2001/ 06/grammar"
06:            xml:lang="en-US" root="main_rule">
07:            <rule id="main_rule" scope="public">
08:                 <one-of>
09:                      <item> ACME Electronics</item>
10:                      <item> Mom and Pops Pizza</item>
11:                      <item> Western Steakhouse</item>
12:                 </one-of>
13:            </rule>
14:     </grammar>
01:     <!--Food Keyword Grammar-->
02:     <?xml version="1.0" encoding ="iso-8859-1"?>
03:     <!DOCTYPE grammar PUBLIC "-//W3C//DTD GRAMMAR 1.0//EN"
04:            "http://www.w3.org/TR/speech-grammar/grammar.dtd">
05:     <grammar version="1.0" xmlns="http://www.w3.org/2001/ 06/grammar"
06:            xml:lang="en-US" root="main_rule">
07:            <rule id="main_rule" scope="public">
08:                 <one-of>
09:                      <item> Mom and Pops Pizza</item>
10:                      <item> Western Steakhouse</item>
11:                 </one-of>
12:            </rule>
13:     </grammar>
```

Readers will note that generating (320) a voice mode user interface to reflect the directory information (308) for each IVR system in the IVR system directory (118) according to embodiments of the present invention advantageously allows an IVR system to dynamically publish itself to callers that utilize the IVR directory service (102). That is, the voice mode user interface of the IVR directory service is updated shortly after the directory information for a new IVR system is added to the directory (118) rather than having to wait extended periods of time such as weeks or months before callers are able to discover or use the IVR system's directory information. Reader will further note that the exemplary voice dialog and the exemplary grammars above are for explanation only and not for limitation.

The method of FIG. 3 includes interacting (326), by the IVR directory service (102) using the voice mode user interface, with a caller to identify a particular IVR system in dependence upon the IVR system directory (118) and query information (328) provided by the caller and to connect the caller with the identified IVR system. The IVR directory service (102) may interact (326) with a caller using the voice mode user interface to identify a particular IVR system according to the method of FIG. 3 by rendering the voice dialogs (324) and grammars (322), receiving speech input from the caller, and utilizing speech recognition results of the caller's speech input to query the IVR system directory (118). Continuing with the exemplary voice dialog and exemplary grammars above, consider following use case describing and interaction between the IVR directory service (102) and a caller using the voice mode user interface to identify a particular IVR system. Rendering the exemplary voice dialog above would provide the user with the following initial prompt:

Do you want to search by key word, product, or company name?

The IVR directory service (102) utilizes a speech engine to identify the caller's response as 'key word,' 'product,' or 'company.' When the caller's response to the initial prompt is 'key word,' the IVR directory service (102) renders this subsequent prompt:

Please say the key word to search for.

The IVR directory service (102) uses the exemplary keyword grammar and a speech engine to identify the caller's response. If the caller's response is 'electronics,' then the IVR directory service (102) queries the IVR system directory (118) for records having 'electronics' as a keyword. Because ACME electronics is the only business associated with the keyword 'electronics,' the IVR directory service (102) transfers the caller to the IVR system for ACME Electronics using the telephone number associated with ACME Electronics in the directory (118). If the caller's response is 'food,' then the IVR directory service (102) renders the following prompt to the caller:

Please choose from the following:
Mom and Pop's Pizza
Western Steakhouse.

The IVR directory service (102) then uses the exemplary food keyword grammar and a speech engine to identify the caller's response. If the caller's response is "Mom and Pop's Pizza," then the IVR directory service (102) queries the IVR system directory (118) for the phone number associated with "Mom and Pop's Pizza" and transfers the caller to the IVR system for Mom and Pop's Pizza using that telephone number. If the caller's response is "Western Steakhouse," then the IVR directory service (102) queries the IVR system directory (118) for the phone number associated with "Western Steakhouse" and transfers the caller to the IVR system for Western Steakhouse using that telephone number.

When the caller's response to the initial prompt of "Do you want to search by key word, product, or company name?" is 'product,' the IVR directory service (102) renders this subsequent prompt:

Please say the product name.

The IVR directory service (102) uses the exemplary product grammar and a speech engine to identify the caller's response. The IVR directory service (102) then queries the IVR system directory (118) for the companies associated with the products specified by the caller. If the caller's response is 'television' or 'radio,' then the IVR directory service (102) queries the IVR system directory (118) and determines that only ACME Electronics is associated with 'television' or 'radio.' Accordingly, the IVR directory service (102) transfers the caller to the IVR system for ACME Electronics using the telephone number associated with ACME Electronics in the directory (118). If the caller's response is 'pizza oven,' then the IVR directory service (102) queries the IVR system directory (118) and determines that only Mom and Pop's Pizza is associated with 'pizza oven.' Accordingly, the IVR directory service (102) transfers the caller to the IVR system for Mom and Pop's Pizza using the telephone number associated with Mom and Pop's Pizza in the directory (118).

When the caller's response to the initial prompt of "Do you want to search by key word, product, or company name?" is 'product,' the IVR directory service (102) renders this subsequent prompt:

Please say the company name.

The IVR directory service (102) uses the exemplary company grammar and a speech engine to identify the caller's response. When the caller's response is 'ACME Electronics,' the IVR directory service (102) queries the IVR directory repository (118) for the telephone number associated with ACME Electronics and transfers the caller to the IVR system of ACME Electronics using that telephone number. When the caller's response is "Mom and Pop's Pizza," the IVR directory service (102) queries the IVR directory repository (118) for the telephone number associated with Mom and Pop's Pizza and transfers the caller to the IVR system of Mom and Pop's Pizza using that telephone number. When the caller's response is 'Western Steakhouse,' the IVR directory service (102) queries the IVR directory repository (118) for the telephone number associated with Western Steakhouse and transfers the caller to the IVR system of Western Steakhouse using that telephone number. Readers will note that the exemplary use case above is for explanation only and not for limitation.

The description with reference to FIG. 3 explains dynamic publishing of directory information according to embodiments of the present invention as the directory information for IVR systems is added to the IVR system repository using web services. In addition, dynamic publishing of directory information according to embodiments of the present invention may also be carried out as the IVR system repository is updated with updated directory information for IVR systems using web services. For example, the telephone number for an IVR system may have been changed. For further explanation, FIG. 4 sets forth a flow chart illustrating a further exemplary method of dynamically publishing directory information for a plurality of IVR systems according to embodiments of the present invention.

Figure 4:
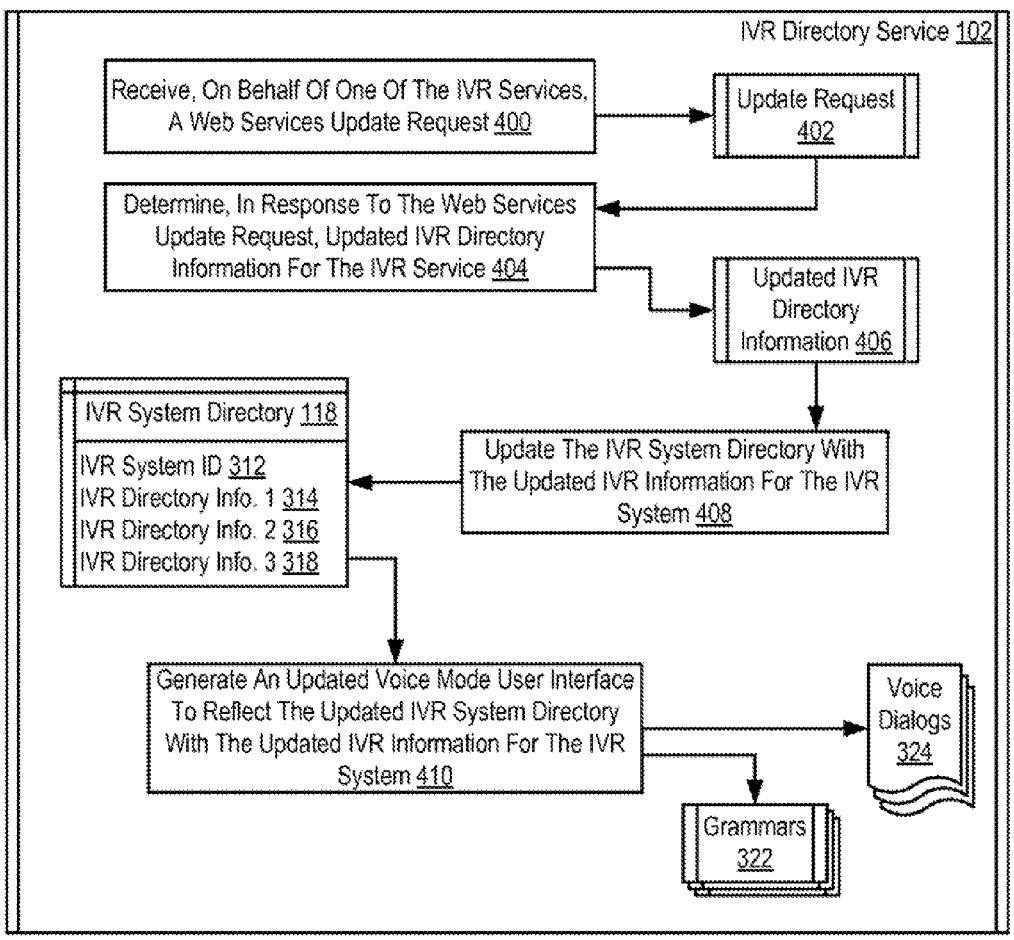
FIG. 4 sets forth a flow chart illustrating a further exemplary method of dynamically publishing directory information for a plurality of IVR systems according to embodiments of the present invention.

The method of FIG. 4 includes receiving (400), by the IVR directory service (102) on behalf of one of the IVR systems, a web services update request (402). The web services update request (402) of FIG. 4 represents a request to updated directory information published for a particular IVR system. The format of the web services update request (402) may be specified in a WSDL document published by the IVR directory service (102) in a UDDI registry in a manner similar to the web services publication requests described above. In the method of FIG. 4, the IVR directory service (102) may receive (400) a web services update request (402) on behalf of one of the IVR systems as a SOAP message from web services components of the IVR systems themselves or from third party web service components instructed by the IVR system providers to register the IVR systems with the IVR directory service (102).

The method of FIG. 4 also includes determining (404), by the IVR directory service (102) in response to the web services update request (402), updated directory information (406) for the IVR system. The updated directory information (406) of FIG. 4 represents updated lookup information, updated connection information, updated description information, or any other updated information for an IVR system. The IVR directory service (102) may determine (404) the updated directory information (406) for the IVR system according to the method of FIG. 4 by retrieving the updated directory information (406) for the IVR system from the web services update requests (402) itself. In some other embodiments, the IVR directory service (102) may determine (404) the updated directory information (406) for the IVR system according to the method of FIG. 4 by performing a web services exchange with the IVR system issuing the update request (402) to obtain the updated directory information (406).

The method of FIG. 4 includes updating (408), by the IVR directory service (102), the IVR system directory (118) with the updated directory information (406) for the IVR system. The IVR directory service (102) may update (408) the IVR system directory (118) with the updated directory information (406) according to the method of FIG. 4 by associating the updated directory information (406) with the IVR system that requesting the update in the IVR system directory (118). In the example of FIG. 4, the IVR system directory (118) is implemented using one or more tables capable of associating an IVR system with directory information for that IVR system. Each record of the exemplary IVR system directory (118) includes an IVR system identifier field (312) and three directory information fields (314, 316, 318). The IVR system identifier field (312) specifies a particular IVR system published by the IVR directory service (102). The three directory information fields (314, 316, 318) specify directory information for the associated IVR system.

The method of FIG. 4 also includes generating (410), by the IVR directory service (102), an updated voice mode user interface to reflect the updated IVR system directory (118) with the updated directory information (406) for the IVR system. The updated voice mode user interface represents a set of instructions that allow the IVR directory service (102) to provide and receive information from a caller using speech and keypad touch tones based on the updated directory information provided by the IVR system. The IVR directory service (102) may generate (410) the updated voice mode user interface according to the method of FIG. 4 by creating one or more IVR voice dialogs (324) in dependence upon the updated directory information (406) in the IVR system directory (118). In addition, the IVR directory service (102) may generate (410) the updated voice mode user interface according to the method of FIG. 4 by creating one or more IVR grammars (322) in dependence upon the updated directory information (406) in the IVR system directory (118).

Readers will note that generating (410) an updated voice mode user interface to reflect the updated IVR system directory (118) with the updated directory information (406) according to embodiments of the present invention advantageously allows an IVR system to dynamically update publication information provided by the IVR directory server (102) to callers. That is, the voice mode user interface of the IVR directory service is updated shortly after the directory (118) is updated with updated directory information for an IVR system rather than having to wait extended periods of time such as weeks or months before callers are able to discover or use the IVR system's updated directory information.

Exemplary embodiments of the present invention are described largely in the context of a fully functional computer system for dynamically publishing directory information for a plurality of IVR systems. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically publishing directory information for a plurality of interactive voice response ('IVR') systems, the method comprising:
    providing, by an IVR directory service, a description of a web services publication interface for the IVR directory service;
    receiving, by the IVR directory service on behalf of one or more IVR systems requesting publication, web services publication requests through the web services publication interface for the IVR directory service;
    determining, by the IVR directory service in response to the web services publication requests, directory information for each IVR system requesting publication;
    receiving, by the IVR directory service on behalf of one of the IVR systems, a web services update request;
    determining, by the IVR directory service in response to the web services update request, updated directory information for the IVR system;
    updating, by the IVR directory service, the IVR system directory with the updated directory information for the IVR system;
    generating, by the IVR directory service, an updated voice mode user interface to reflect the updated IVR system directory with the updated directory information for the IVR system, the generating including creating one more voice dialogs in accordance with the directory information, the one or more voice dialogs specifying a call flow defining the interaction between a caller and the IVR directory service; and
    interacting, by the IVR directory service using the voice mode user interface, with the caller to identify a particular IVR system in dependence upon the IVR system directory and query information provided by the caller and to connect the caller with the identified IVR system.

2. The method of claim 1, wherein determining, by the IVR directory service in response to the web services publication requests, directory information for each IVR system requesting publication further comprises retrieving the directory information for each IVR system from the web services publication requests.

3. The method of claim 1, wherein determining, by the IVR directory service in response to the web services publication requests, directory information for each IVR system requesting publication further comprises performing a web services exchange with each IVR system requesting publication to obtain the directory information for each IVR system.

4. The method of claim 1, wherein generating, by the IVR directory service, a voice mode user interface to reflect the updated IVR system directory with the updated directory information further comprises creating one or more IVR grammars in dependence upon the updated directory information in the IVR system directory.

5. The method of claim 1, wherein receiving, by the IVR directory service on behalf of one of the IVR systems, the web services update request comprises receiving, the web services update request from a third party web service.

6. A method of dynamically publishing directory information for a plurality of interactive voice response ('IVR') systems, the method comprising:
    providing, by an IVR directory service, a description of a web services publication interface for the IVR directory service;
    receiving, by the IVR directory service on behalf of one or more IVR systems requesting publication, web services publication requests through the web services publication interface for the IVR directory service;
    determining, by the IVR directory service in response to the web services publication requests, directory information for each IVR system requesting publication;
    receiving, by the IVR directory service on behalf of one of the IVR systems, a web services update request, wherein the web services update request comprises at least one of updated lookup information, updated connection information, and updated description information;
    determining, by the IVR directory service in response to the web services update request, updated directory information for the IVR system;
    updating, by the IVR directory service, the IVR system directory with the updated directory information for the IVR system;
    generating, by the IVR directory service, an updated voice mode user interface to reflect the updated IVR system directory with the updated directory information for the IVR system, the generating including creating one more voice dialogs in accordance with the directory information, the one or more voice dialogs specifying a call flow defining the interaction between a caller and the IVR directory service; and
    interacting, by the IVR directory service using the voice mode user interface, with the caller to identify a particular IVR system in dependence upon the IVR system directory and query information provided by the caller and to connect the caller with the identified IVR system.

7. The method of claim 6, wherein determining, by the IVR directory service in response to the web services publication requests, directory information for each IVR system requesting publication further comprises retrieving the directory information for each IVR system from the web services publication requests.

8. The method of claim 6, wherein determining, by the IVR directory service in response to the web services publication requests, directory information for each IVR system requesting publication further comprises performing a web services exchange with each IVR system requesting publication to obtain the directory information for each IVR system.

9. The method of claim 6, wherein generating, by the IVR directory service, a voice mode user interface to reflect the updated IVR system directory with the updated directory information further comprises creating one or more IVR grammars in dependence upon the updated directory information in the IVR system directory.

10. The method of claim 6, wherein receiving, by the IVR directory service on behalf of one of the IVR systems, the web services update request comprises receiving, the web services update request from a third party web service.

11. Apparatus for dynamically publishing directory information for a plurality of interactive voice response ('IVR') systems, the apparatus comprising:
    a computer processor;
    a computer memory operatively coupled to the computer processor, the computer memory having computer program instructions configured to,
        provide, by an IVR directory service, a description of a web services publication interface for the IVR directory service;
        receive, by the IVR directory service on behalf of one or more IVR systems requesting publication, web services publication requests through the web services publication interface for the IVR directory service;
        determine, by the IVR directory service in response to the web services publication requests, directory information for each IVR system requesting publication;
        receive, by the IVR directory service on behalf of one of the IVR systems, a web services update request;
        determine, by the IVR directory service in response to the web services update request, updated directory information for the IVR system;
        update, by the IVR directory service, the IVR system directory with the updated directory information for the IVR system;
        generate, by the IVR directory service, an updated voice mode user interface to reflect the updated IVR system directory with the updated directory information for the IVR system, the generating including creating one more voice dialogs in accordance with the directory information, the one or more voice dialogs specifying a call flow defining the interaction between a caller and the IVR directory service; and
        interact, by the IVR directory service using the voice mode user interface, with the caller to identify a particular IVR system in dependence upon the IVR system directory and query information provided by the caller and to connect the caller with the identified IVR system.

12. The apparatus of claim 11, wherein the computer program instructions configured to determine, by the IVR directory service in response to the web services publication requests, directory information for each IVR system requesting publication comprises computer program instructions configured to retrieve the directory information for each IVR system from the web services publication requests.

13. The apparatus of claim 11, wherein the computer program instructions configured to determine, by the IVR directory service in response to the web services publication requests, directory information for each IVR system requesting publication comprises computer program instructions configured to perform a web services exchange with each IVR system requesting publication to obtain the directory information for each IVR system.

14. The apparatus of claim 11, wherein the computer program instructions configured to generate, by the IVR directory service, a voice mode user interface to reflect the updated IVR system directory with the updated directory information comprises computer program instructions configured to create one or more IVR grammars in dependence upon the updated directory information in the IVR system directory.

15. The apparatus of claim 11, wherein the computer program instructions configured to receive, by the IVR directory service on behalf of one of the IVR systems, the web services update request comprises computer program instructions configured to receive, the web services update request from a third party web service.

16. A computer program product for dynamically publishing directory information for a plurality of interactive voice response ('IVR') systems, the computer program product comprising:
    a computer readable storage medium having computer usable program code embodied therewith, the computer program instructions comprising a computer program instructions configured to:
        provide, by an IVR directory service, a description of a web services publication interface for the IVR directory service;
        receive, by the IVR directory service on behalf of one or more IVR systems requesting publication, web services publication requests through the web services publication interface for the IVR directory service;
        determine, by the IVR directory service in response to the web services publication requests, directory information for each IVR system requesting publication;
        receive, by the IVR directory service on behalf of one of the IVR systems, a web services update request;
        determine, by the IVR directory service in response to the web services update request, updated directory information for the IVR system;
        update, by the IVR directory service, the IVR system directory with the updated directory information for the IVR system;
        generate, by the IVR directory service, an updated voice mode user interface to reflect the updated IVR system directory with the updated directory information for the IVR system, the generating including creating one more voice dialogs in accordance with the directory information, the one or more voice dialogs specifying a call flow defining the interaction between a caller and the IVR directory service; and
        interact, by the IVR directory service using the voice mode user interface, with the caller to identify a particular IVR system in dependence upon the IVR system directory and query information provided by the caller and to connect the caller with the identified IVR system.

17. The computer program product of claim 16, wherein the computer program instructions configured to determine, by the IVR directory service in response to the web services publication requests, directory information for each IVR system requesting publication comprises computer program instructions configured to retrieve the directory information for each IVR system from the web services publication requests.

18. The computer program product of claim 16, wherein the computer program instructions configured to determine, by the IVR directory service in response to the web services publication requests, directory information for each IVR system requesting publication comprises computer program instructions configured to perform a web services exchange with each IVR system requesting publication to obtain the directory information for each IVR system.

19. The computer program product of claim 16, wherein the computer program instructions configured to generate, by the IVR directory service, a voice mode user interface to reflect the updated IVR system directory with the updated directory information comprises computer program instructions configured to create one or more IVR grammars in dependence upon the updated directory information in the IVR system directory.

20. The computer program product of claim 16, wherein the computer program instructions configured to receive, by the IVR directory service on behalf of one of the IVR systems, the web services update request comprises computer program instructions configured to receive, the web services update request from a third party web service.

* * * * *